United States Patent [19]

Ayasli

[11] Patent Number: 4,908,820
[45] Date of Patent: Mar. 13, 1990

[54] NON-RECIPROCAL BIDIRECTIONAL DUPLEXER

[75] Inventor: Yalcin Ayasli, Lexington, Mass.

[73] Assignee: Hittite Microwave Corporation, Woburn, Mass.

[21] Appl. No.: 330,413

[22] Filed: Mar. 29, 1989

[51] Int. Cl.$^4$ .......................... H04B 1/58; H04B 3/23
[52] U.S. Cl. ...................... 370/38; 333/1.1; 333/100; 455/6; 455/14; 370/24
[58] Field of Search .............. 370/38, 24, 32; 375/35; 455/6, 14, 15, 19, 39; 333/1.1, 100

[56] References Cited

U.S. PATENT DOCUMENTS

| | | | |
|---|---|---|---|
| 4,325,140 | 4/1982 | Stitzer | 370/38 |
| 4,761,621 | 8/1988 | Kane et al. | 333/1.1 |
| 4,801,901 | 1/1989 | Ayasli | 333/1.1 |

Primary Examiner—Douglas W. Olms
Assistant Examiner—Christopher O. Edwards
Attorney, Agent, or Firm—Joseph S. Iandiorio

[57] ABSTRACT

A non-reciprocal bidirectional duplexer includes a first transmission medium extending from a first terminal to a third terminal; a second transmission medium extending from the second terminal to the third terminal; and a plurality of non-reciprocal, bidirectional phase shifting elements, coupling the transmission mediums and spaced along them; each of the phase shifting elements includes means for amplifying a signal in a first direction from the first to the second transmission medium and for amplifying a signal in the second direction from the second to the first transmission medium; and means for establishing a phase differential between the signals moving in the first and second directions.

7 Claims, 2 Drawing Sheets

NON-RECIPROCAL BIDIRECTIONAL DUPLEXER

FIELD OF INVENTION

This invention relates to a non-reciprocal bidirectional duplexer, and more particularly to non-reciprocal, bidirectional circulator for a transmitter/receiver antenna circuit.

BACKGROUND OF INVENTION

Conventional bidirectional, non-reciprocal duplexers and circulators for use in antenna systems and other circuits have a number of shortcomings. Typically they are constituted by ferrite components, which cannot be fabricated using integrated circuit technology. Further, ferrite-based devices are relatively large and expensive and have a limited bandwidth.

SUMMARY OF INVENTION

It is therefore an object of this invention to provide an improved non-ferrite, bidirectional, non-reciprocal duplexer.

It is a further object of this invention to provide such an improved duplexer which is smaller, lighter and less expensive.

It is a further object of this invention to provide such an improved duplexer which has a wider bandwidth.

This invention results from the realization that a truly improved, smaller non-reciprocal, bidirectional duplexer can be fabricated in integrated circuit technology using non-reciprocal, bidirectional phase shifting elements which impart differential phase shift to signals going in opposite directions between transmission mediums.

This invention features a non-reciprocal, bidirectional duplexer comprising a first transmission medium extending from a first terminal to a third terminal, and a second transmission medium extending from a second terminal to the third terminal. There are a plurality of non-reciprocal, bidirectional phase shifting elements coupling the transmission mediums and spaced along them. Each of the phase shifting elements includes means for amplifying a signal in a first direction from the first to the second transmission medium, and amplifying a signal in a second direction from the second to the first transmission medium. The phase shifting element further includes means for establishing a phase differential between the signals moving in the first and second directions.

In a preferred embodiment the means for amplifying may include a first amplifier for amplifying in the first direction and a second amplifier for amplifying in the second direction. The means for establishing a phase differential may include a coplanar, slot-line transmission, or an FET amplifier. The first and second transmission mediums may include lumped element transmission line sections. The phase shifting elements may be connected between the transmission mediums between the transmission line sections. The first and second amplifiers may be interconnected between the first and second transmission mediums between the transmission line sections.

In an alternative construction the duplexer may be implemented in the form of a circulator wherein the first and second terminals are the transmitter and receiver terminals and the third terminal is the antenna terminal

DISCLOSURE OF PREFERRED EMBODIMENT

Other objects, features and advantages will occur to those skilled in the art from the following description of a preferred embodiment and the accompanying drawings, in which.

The invention may be accomplished in a circulator having transmitter, receiver and antenna terminals. Transmission mediums extend between each of the receiver and transmitter terminals and the antenna terminal. Each transmission medium may include a series of lumped element transmission line sections, such as 0.3 nH inductances. Connected across the transmission mediums between the lumped element transmission line sections and spaced along the transmission mediums are phase shifting elements. These typically have two channels, with an FET amplifier in each channel that introduces a 180 degree phase shift. In addition, there is a transition element which introduces another 180° phase shift in one of the channels. Thus one channel has a 180° phase shift and the other has a 360° or 0° phase shift. The channel that carries the signal from the transmitter transmission medium to the receiver transmission medium typically has the 360° or 0° phase shift, while the amplifier channel that carries the signal from the receiver transmission medium to the transmitter transmission medium introduces a 180° phase shift.

Alternatively, the transition element can be removed so that the two channels can be separated. The second 180° phase shift is then provided by a second phase shifting device such as an FET amplifier. In that construction the two channels can be separated so that each one connects across the transmission medium and interconnects with the respective transmission mediums between the lumped element transmission line sections. This permits an additional degree of design freedom in configuring the circuit.

Figure 1:
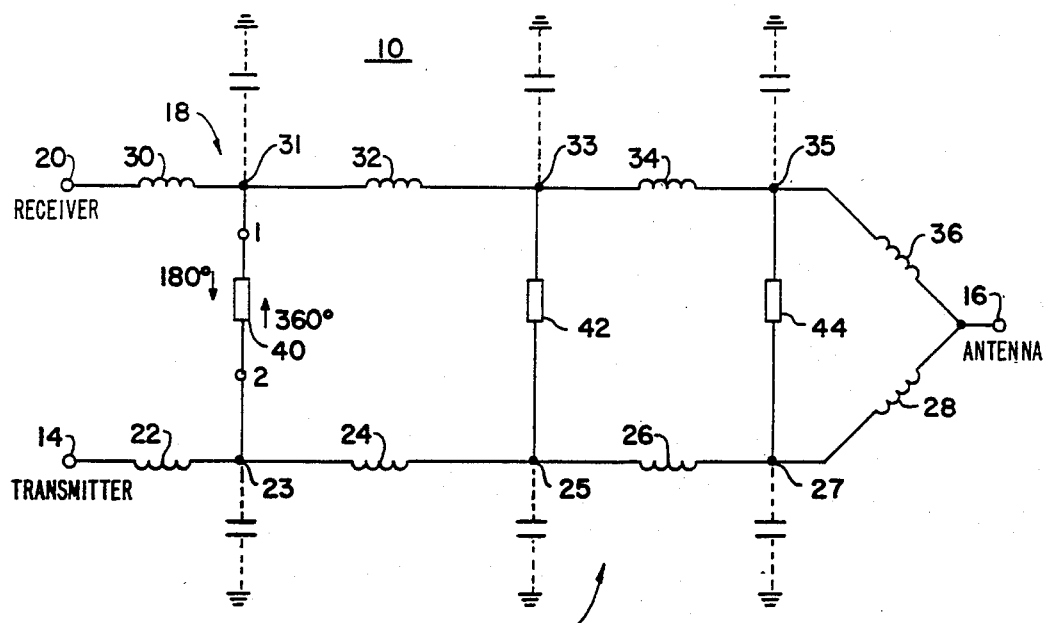
FIG. 1 is a schematic diagram of a non-reciprocal, bidirectional duplexer according to this invention implemented as a circulator.

There is shown in FIG. 1 a duplexer 10 according to this invention implemented in the form of a circulator. Transmission line 12 extends between transmitter terminal 14 and antenna terminal 16, while transmission line 18 extends between receiver terminal 20 and antenna terminal 16. Transmission line 12 may be composed of a series of lumped element transmission line sections such as inductances 24, 26, and 28, which may be 0.3 nH inductances. Transmission line 18 is similarly formed of inductances 30, 32, 34, and 36. Sections 22, 24 and 26 form junctions 23, 25, 27 and sections 30, 32, 34 form junctions 31, 33 and 35, respectively. Connected between transmission lines 12 and 18 are a plurality of phase shifting elements 40, 42, and 44. Each of them is connected to the associated transmission lines 12 and 18 between the lumped element transmission line sections.

For example, element 40 is connected between inductances 30 and 32 on line 18, and between inductances 22 and 24 on line 12. Phase shifting element 42 is similarly connected between inductances 32 and 34 on line 18, and 24 and 26 on line 12, while phase shifting element 44 is connected between inductances 34 and 36 on line 18 and between inductances 26 and 28 on line 12. When the signal arrives on transmitter terminal 14, it propagates through inductances 22, 24, 26 and 28 to terminal 16. It also propagates through phase shifting element 40 and inductances 32, 34 and 36 and through inductances 22 and 24 and then phase shifting element 42, after which the signal moves through inductances 34 and 36. The signal from transmitter 14 also moves through inductances 22, 24 and 26, and then through phase shifting element 44, and finally through inductance 36 before it reaches terminal 16. Thus no matter which path the signal travels from transmitter 14 to antenna 16, its phase is unchanged and so the signals are in phase, or added up, at antenna 16.

Figure 2:
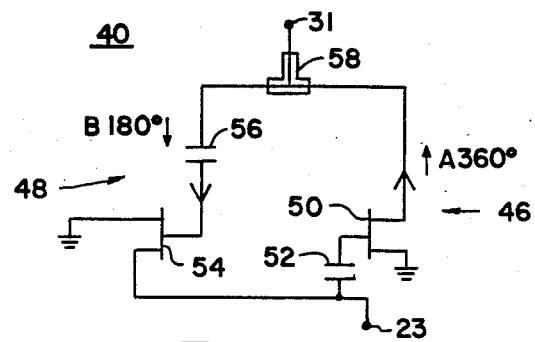
FIG. 2 is a more detailed circuit diagram of one of the phase shifting elements of FIG. 1.

In contrast, signals attempting to flow from transmitter 14 to receiver 20 each flow through different paths and have imparted to them different phase shifts. For example, as the signal moves in terminal 14 through inductance 22, phase shifting element 40 and inductance 30, it assumes a first phase. However, the signal that continues on from inductance 22 through inductance 24, through phase shifting element 42, and then returns to receiver 20 through inductances 32 and 30, will have an additional phase shift due to the added inductances 24 and 32 through which it passes. Thus the same situation occurs with respect to signals through phase shifting element 44, and so the signals which arrive at receiver 20 are out of phase and tend to cancel each other. However, incoming signals at antenna terminal 16 are treated differently because of the non-reciprocal nature of the bidirectional duplexer 10. An input signal at antenna terminal 16 moves directly through inductances 36, 34, 32 and 30 to receiver terminal 20. Signals at terminal 16 also move through inductance 28, then through phase shifting element 44, and finally through inductances 34, 32 and 30 once again. Signals also can move through inductances 28, 26, then phase shifting element 42 and inductances 32 and 30, or through inductances 28, 26, 24, phase shifting element 40, and then inductance 30. In each of these cases the signals arrive at receiver 20 in phase and are added. However, signals that move through inductance 36 and then down through phase shifting element 44, or through inductance 36 and 34 and then down through phase shifting element 42, or through inductances 36, 34, 32 and then through phase shifting element 40 to transmission line 12, and the appropriate inductances 26, 24 and 22, are out of phase because in the direction from transmission line 18 to transmission line 12 there is a 180° phase shift imparted to the signal. Thus the signals originating at antenna 16 which arrive at transmitter 14 are out of phase and will cancel each other. Phase shifting elements 40, 42 and 44 may be constructed as shown with respect to element 40 shown in detail in FIG. 2.

There it can be seen that between terminals 23 and 31 phase shifting element 40 has two channels. Channel A, 46, includes an FET amplifier including an FET 50 such as a 200 micron gate periphery interconnected to terminal 23 through a capacitor 52 such as a 0.5 picofarad capacitor. Channel B, 48, includes another amplifier including, for example, FET 54, whose drain is connected through capacitor 56 to transition element 58, which in turn is connected to terminal 31. Transition element 58 introduces a zero phase shift in channel B but a 180° phase shift in channel A. Thus channel A's total phase shift is 360°, while channel B's is only 180°. The current flow in channel A is from terminal 23 through capacitor 52 and FET 50 to transition 58 in terminal 31. In channel B the current flow is from terminal 31 through transition 58, capacitor 56, and FET 54 to terminal 23.

Figure 3:
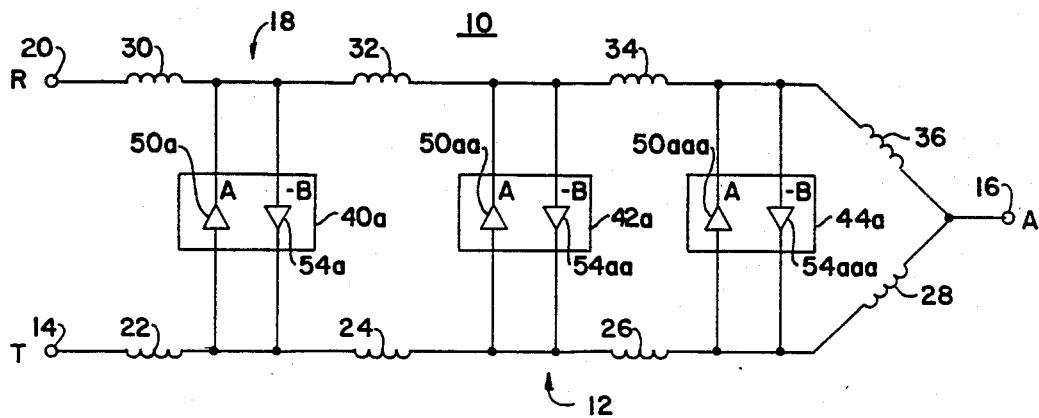
FIG. 3 is an equivalent circuit diagram illustrating the operation of the circuit of FIG. 1.

A better understanding of the operation of the duplexer-circulator of FIG. 1 can be envisioned through the equivalent circuit shown in FIG. 3, where phase shifter elements 40, 42 and 44 are represented by dual amplifiers 50a and 54a, each of which carries current in the direction as indicated.

Figure 4:
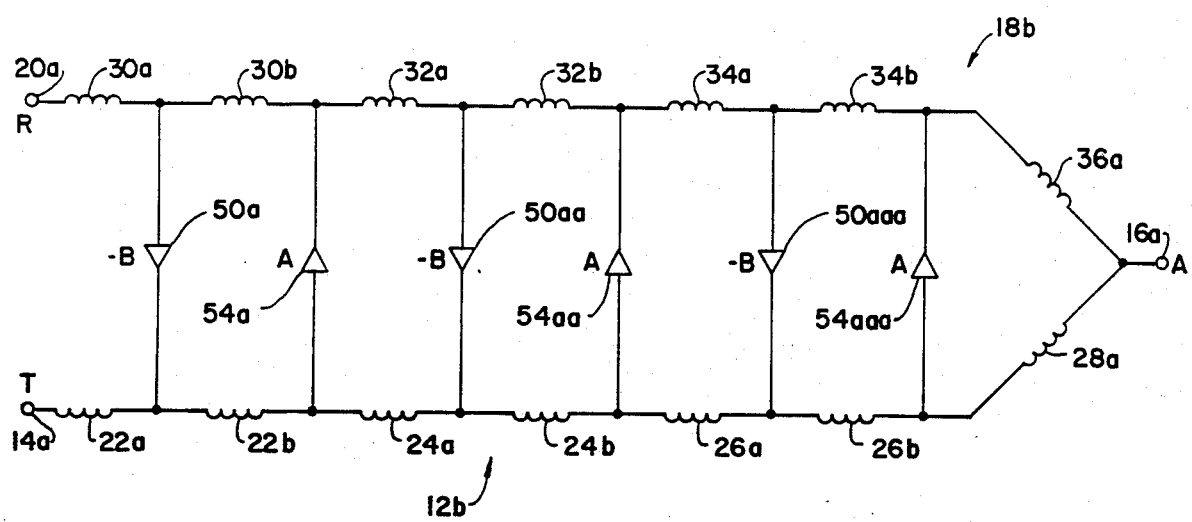
FIG. 4 is a schematic diagram of an alternative construction of a duplexer according to this invention in which the dual amplifiers in each phase shifter element are separated.

Another construction is shown in FIG. 4, wherein the amplifiers have been separated by additional lumped element transmission line sections such as inductances 30b, 32b, 34b, on transmission line 18b and inductances 22b, 24b and 26b on transmission line 12b.

Figure 5:
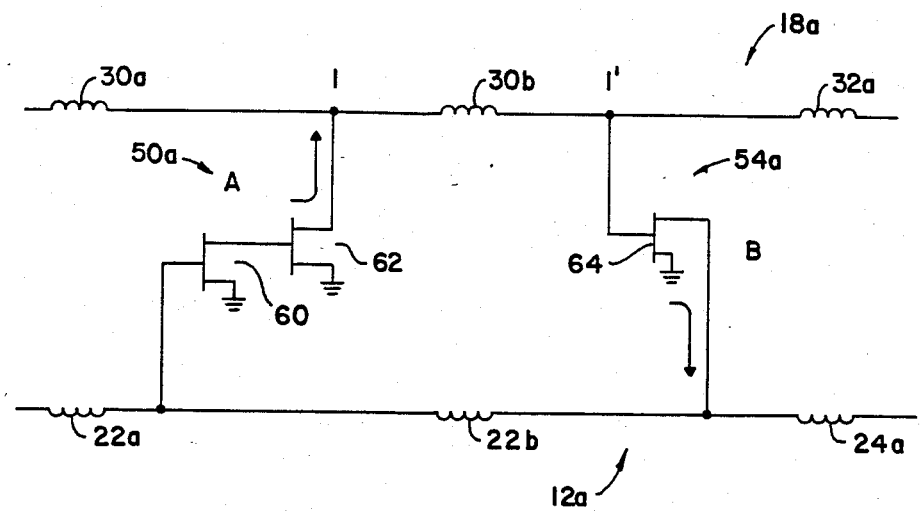
FIG. 5 is a detailed schematic of the amplifiers in one of the elements of FIG. 4.

Phase shifting elements 50a and 54a may be implemented as shown in FIG. 5, where amplifier 50a actually includes two FETs 60 and 62 to produced the 360° phase shift previously provided by one FET amplifier and transition section 58. Amplifier 54a in channel B still uses but one FET 64 in this connection. However in this case channel A and channel B are totally separated so that the additional transmission line lumped element inductances 30b and 22b can be interposed between the connections of channels A and B to transmission lines 12a and 18a.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. A non-reciprocal, bidirectional duplexer comprising:
   a first transmission medium extending from a first terminal to a third terminal;
   a second transmission medium extending from a second terminal to said third terminal; and
   a plurality of non-reciprocal, bidirectional phase shifting elements coupling said transmission mediums and spaced along them; each said phase shifting element including means for amplifying a signal in a first direction from said first to said second transmission medium, and for amplifying a signal in a second direction from said second to said first transmission medium, and means for establishing a phase differential between the signals moving in said first and second directions.

2. The non-reciprocal, bidirectional duplexer of claim 1 in which said means for amplifying includes a first amplifier for amplifying in said first direction and a second amplifier for amplifying in said second direction.

3. The non-reciprocal, bidirectional duplexer of claim 1 in which said means for establishing a phase differential includes an FET amplifier.

4. The non-reciprocal, bidirectional duplexer of claim 1 in which said first and second transmission mediums include lumped element transmission line sections.

5. The non-reciprocal, bidirectional duplexer of claim 1 in which said phase shifting elements are interconnected between said transmission mediums.

6. The non-reciprocal, bidirectional duplexer of claim 1 in which said first and second transmission mediums include lumped element transmission line sections and said first and second amplifiers are interconnected between said first and second transmission mediums between said transmission line sections.

7. A non-reciprocal, bidirectional circulator comprising:
   a first transmission medium extending from a transmitter terminal to an antenna terminal;
   a second transmission medium extending from a receiver terminal to the antenna terminal; and
   a plurality of non-reciprocal, bidirectional phase shifting elements coupling the transmission mediums and spaced along them; each said phase shifting element including means for amplifying a signal in a first direction from the first to the second transmission medium, and for amplifying a signal in a second direction from said second to said first transmission medium, and means for establishing a phase differential between the signals moving in said first and second directions.

* * * * *